United States Patent [19]

Maloney

[11] Patent Number: 4,615,381
[45] Date of Patent: Oct. 7, 1986

[54] SOLAR HEATING AND COOLING DIODE MODULE

[75] Inventor: Timothy J. Maloney, Winchester, Va.

[73] Assignee: One Design, Inc., Winchester, Va.

[21] Appl. No.: 576,809

[22] Filed: Feb. 7, 1984

Related U.S. Application Data

[63] Continuation of Ser. No. 403,915, Jul. 30, 1982, abandoned.

[51] Int. Cl.$^4$ ............................................. F24C 5/04
[52] U.S. Cl. .................................. 165/48.2; 126/434; 126/417
[58] Field of Search ............... 126/433, 450, 417, 434; 62/235.1, 324.1; 165/485, 104.19, 48.2

[56] References Cited

U.S. PATENT DOCUMENTS

| | | | |
|---|---|---|---|
| 2,595,905 | 5/1952 | Telkes | 126/270 |
| 3,563,305 | 2/1971 | Hay | 165/2 |
| 3,990,635 | 11/1976 | Restle et al. | 237/1 A |
| 4,050,508 | 9/1977 | Buckley | 165/32 |
| 4,121,565 | 10/1978 | Grisbrook | 126/270 |
| 4,137,964 | 2/1979 | Buckley | 165/1 |
| 4,149,589 | 4/1979 | Hopman | 165/32 |
| 4,158,686 | 6/1979 | Boeckmann | 264/45 |
| 4,162,671 | 7/1979 | Christy | 126/400 |
| 4,173,969 | 11/1979 | Scholl | 126/417 |
| 4,227,939 | 10/1980 | Zewail et al. | 136/247 |
| 4,243,022 | 1/1981 | Pedone | 126/449 |
| 4,245,617 | 1/1981 | Buckley | 126/434 |
| 4,257,477 | 3/1981 | Maloney | 165/48 |
| 4,263,765 | 4/1981 | Maloney | 52/562 |
| 4,273,100 | 6/1981 | Cogliano | 126/433 |
| 4,274,548 | 6/1981 | Schneider | 220/72 |
| 4,280,483 | 7/1981 | Schaffer | 126/433 |
| 4,289,115 | 9/1981 | O'Hanlon | 62/235.1 |
| 4,290,416 | 9/1981 | Maloney | 126/430 |
| 4,294,229 | 10/1981 | Maloney | 126/434 |

FOREIGN PATENT DOCUMENTS 2732881 2/1979 Fed. Rep. of Germany .
2040436 8/1980 United Kingdom .
2070231 9/1981 United Kingdom .

OTHER PUBLICATIONS

Solar Energy Handbook, Edward Moran, "Solar Battery for Passive Heating" (Date Unknown).
"The Best in Solar", James A. Dawson, Aug. 1, 1981.
"Report on Tests of a Passive Phase Change Solar Diode for Space Heating", Progress in Solar Energy, by American Section of the International Solar Energy Society, Inc. (1982), pp. 803–808.

Primary Examiner—Henry Bennett
Attorney, Agent, or Firm—Finnegan, Henderson, Farabow, Garrett & Dunner

[57] ABSTRACT

A high efficiency solar heating system comprising a plurality of hollow modular units each for receiving a thermal storage mass, the units being arranged in stacked relation in the exterior frame of a building, each of the units including a port for filling the unit with the mass, a collector region and a storage region, each region having inner and outer walls, the outer wall of the collector region being oriented for exposure to sunlight for heating the thermal storage mass; the storage region having an opening therein and the collector region having a corresponding opening, the openings being joined for communicating the thermal storage mass between the storage and collector regions by thermosiphoning; the collector region being disposed substantially below and in parallel relation to the storage region in the modular unit; and the inner wall of the collector region of each successive modular unit in the stacked relation extending over the outer wall of the storage region of the next lower modular unit in the stacked relation for reducing heat loss from the system. Various modifications and alternatives are disclosed for both heating and cooling applications.

44 Claims, 16 Drawing Figures

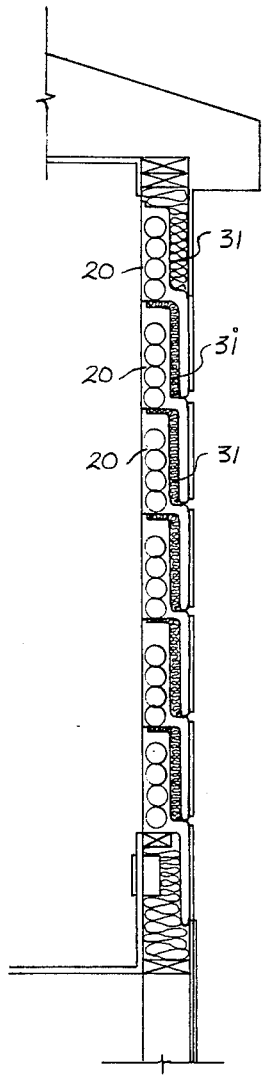
FIG. 1
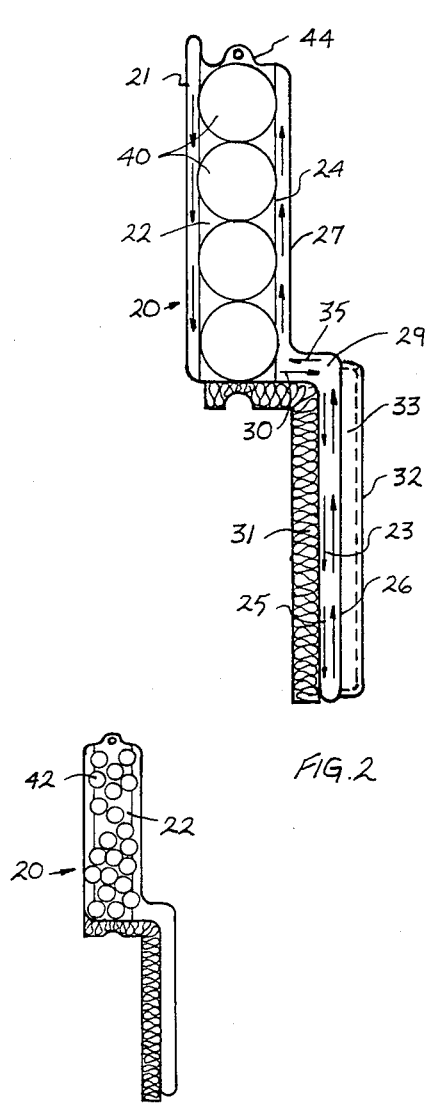
FIG. 2
FIG. 3
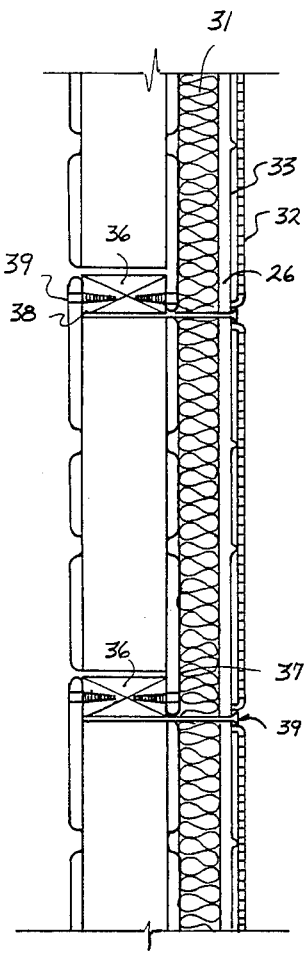
FIG. 4

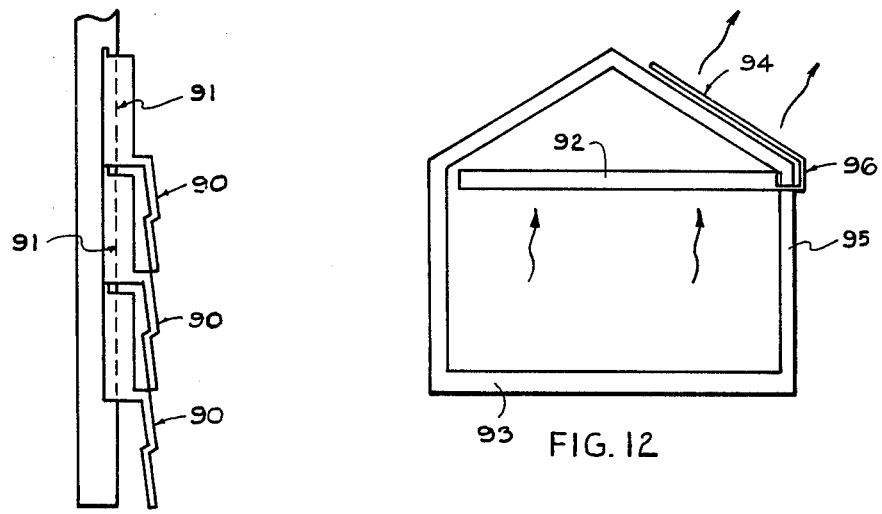
FIG. 11
FIG. 12
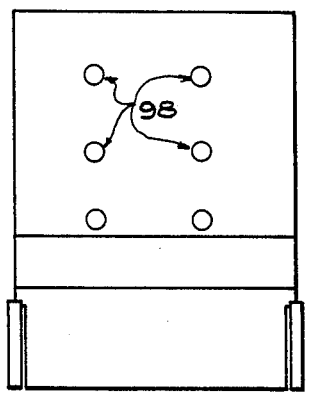
FIG. 13
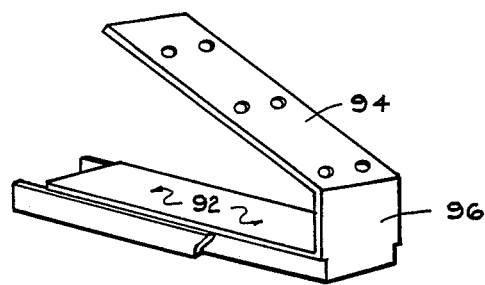
FIG. 14

SOLAR HEATING AND COOLING DIODE MODULE

This application is a continuation, of application Ser. No. 403,915, filed July 30, 1982, now abandoned.

FIELD OF INVENTION

This invention relates to solar heating devices and cooling devices, and more specifically to a device for mounting in the frame of a building for collecting and storing heat from the sun, and dissipating that heat into the interior of the building. Such devices may also be utilized in reverse for cooling a building.

BACKGROUND OF THE INVENTION

The development of efficient and economical systems and techniques for the passive heating and cooling of buildings and other structures has become increasingly important in recent years. A number of devices and methods have been developed for harnessing heat energy from the sun and utilizing that heat for hot water or space heating purposes. Several of these devices utilize a thermal mass or fluid for receiving and storing radiant energy from the sun. Some such devices rely on natural thermosiphoning for creating convection currents in which the warmer fluid rises and the cooler fluid sinks.

For example, one conventional method of heating hot water by solar energy utilizes a thermosiphoning system in which a solar collector is located below a water storage tank. The top of the collector is connected to the top of the storage tank, and the bottom of the collector is connected to the bottom of the storage tank so that heated water from the collector may rise as a result of its lower density into the storage tank, and cooler water may sink to the bottom of the storage tank and return to the bottom on the collector. In such a system, there is a thermosiphoning circulation during the day in which hot water is continually flowing from the top of the collector to the top of the storage tank. After dark, the less dense heated water remains at the top of the storage tank and is available for hot water or heating use.

The thermosiphoning principle has also been applied to systems in which the solar collector is located on the same level as the water storage device. Generally, these devices include a valve arrangement for preventing reverse thermosiphoning at night. Examples of such devices are shown in U.S. Pat. Nos. 4,050,508 and 4,245,617 to Buckley, 4,149,589 to Hoffman, and 4,290,416 and 4,294,229 to Maloney, the named inventor herein.

Although earlier designs in solar heating devices generally required exterior mounting on the roof of a building or structure, more recent designs have placed emphasis on devices which can be installed directly in the wall or roof frame structure of the building. However, such devices have not been readily accepted commercially by builders and other developers because of their high cost, the difficulty of incorporating such devices into standard housing plans, and the adverse visual and esthetic impact on the overall house design perceived by the majority of home buyers. In addition, the difficulty of installing the necessary components and plumbing elements in the narrow space provided by a building frame has generally prevented the commercial acceptance of the above-described solar heating devices. In addition, the anti-reversing valves and other innerconnections required in such devices have proven to be difficult and costly to manufacture.

Numerous attempts have also been made in the prior art to increase the efficiency of solar heating devices. Typically, the efficiency of a solar heating system will be a function of the ability to collect and store heat while limiting the losses of heat from the building or structure. One approach to this problem has been the use of movable insulation devices which limit nighttime losses by shielding the solar collection area. However, the use of movable insulation is expensive, involves interference with interior design and requires daily operation and access to the system.

Accordingly, it is a primary object of this invention to increase the efficiency of solar heating devices.

It is a further object of this invention to provide a solar heating device which is both highly efficient and economical to manufacture.

Another object of the invention is to allow installation of a solar heating device directly in the exterior frame of a building without significantly modifying the aesthetic lines of the building and to blend the device aesthetically with other building materials.

An additional object of the invention is to eliminate the need for cumbersome and space-consuming plumbing connections between the collection and storage areas in a solar heating device.

It is a further object of the invention to provide a passive means for cooling a building which is economical to manufacture and simple to install.

Additional objects and advantages of the invention will be set forth in part in the description which follows, and in part will be obvious from the description or may be learned by practice of the invention.

SUMMARY OF THE INVENTION

To achieve the foregoing objects and in accordance with the purpose of the invention, as embodied and broadly described herein, the high efficiency solar heating system of the present invention comprises a plurality of hollow modular units each for receiving a thermal storage mass, the units being arranged in stacked relation in an exterior frame of a building, each of the units including port means for filling the unit with the mass, a collector region and a storage region. Each of the regions has inner and outer walls, the outer wall of the collector region being oriented for exposure to sunlight for heating the thermal storage mass. The storage region has an opening therein, and the collector region has a corresponding opening, the openings being joined for communicating thermal storage mass between the storage and collector regions by thermosiphoning. The collector region is disposed substantially below and in parallel relation to the storage region in the modular heating unit, and the collector region of each successive modular unit in the stacked relation extends over the storage region of the next lower modular unit in the stacked relation for reducing by this overlap heat loss from the system.

Preferably, the inner wall of the storage region is disposed for radiating heat from the thermal storage mass to the interior of the building and may include an integral or applied decorative texture. The system preferably includes insulation means mounted between each adjacent outer wall of the storage region and inner wall of the collector region. Insulation may also be present between the top of one storage region and the bottom of the next storage region above for further reducing heat loss from the system. Glazing means is typically attached to the outer wall of the collector region confining an insulative air space.

Preferably, the walls of the storage and collector regions have substantially equal widths and the corresponding openings in the collector and storage regions form an integral throat having a width substantially equal to the width of the storage and collector regions. It is preferred that the storage and collector regions be integrally formed, and that the modular unit be seamless. The modular unit can be configured to form the weatherable surface of the building envelope and to seal against water and air infiltration.

It is also preferred that the heated thermal storage mass flow from the collector region through the integral throat to the storage region and the cooler thermal storage mass flow from the storage region through the throat to the collector region in a bi-laminar flow, separated by a thin film of stationary fluid. This upward and simultaneous downward flow in a thin space, such as ¼ inch, simplifies the molding of the device by eliminating the need for traditional return flow plumbing between storage and collector and permits compact design, seamless molding and more simple installation procedures.

Alternately, this compact design may be molded in long lengths in the proportion of overlapping chapboard siding to be retrofitted to the exterior frame of existing buildings.

The insulation means may be a light transmitting material, and each entire modular unit is preferably formed of a light transmitting material such as plastic or glass.

Tensile means may be mounted between the inner and outer walls of either the collector or storage region for maintaining the rigidity of the walls of the region when it is filled with a thermal storage mass.

A fluid tight chamber may be provided within the storage region for receiving a second thermal storage mass, the second thermal storage mass for absorbing heat from the thermal storage mass. It is preferred that the chamber include a plurality of separate horizontal tubes integrally formed in the storage region, or a rectilinear envelope deployed vertically, each chamber including port means for filling the tube with the second thermal storage mass. The second thermal storage mass is typically a phase change material such as sodium chloride hexahydrate. The thermal storage mass transfers collected solar energy to all sides of the phase change material which enhances the rate of heat transfer into and out of the phase change material.

Various additional features of the modular unit are also disclosed.

The modular cooling device of the present invention comprises a thermal collection and storage tank mounted in the upper region within the building, for collection and storage of heat from the interior. A heat dissipator is joined to the tank, the dissipator being oriented above the tank and outside the building for receiving heated thermal storage mass from the tank by thermosiphoning, and for dissipating heat collected by the collection and storage tank into the atmosphere by night sky radiation, convection, conduction and evaporation. The building includes an insulation envelope, and the device includes an integral throat connecting the tank and the dissipator, the throat extending through the insulation envelope to the dissipator.

Preferably, the tank, the throat and the dissipator are integral, and are seamless.

BRIEF DESCRIPTION OF THE DRAWINGS

The accompanying drawings which are incorporated in and constitute a part of this specification, illustrate several embodiments of the invention, and, together with the description, serve to explain the principles of the invention. Of the Drawings:

FIG. 1 is a vertical sectional view of a building wall showing the stacked modular units of the invention;

FIG. 2 is a sectional view of one embodiment of the modular unit of the invention;

FIG. 3 is a vertical sectional view of an alternative embodiment of the modular unit;

FIG. 4 is a horizontal section of the solar heating system of FIG. 1;

FIG. 11 is a vertical section of an alternative configuration of the modules of the invention resembling a clapboard shape;

FIG. 12 is a schematic view of a building having the cooling device of the invention installed therein;

FIG. 13 is an end view of the cooling device shown in FIG. 12;

FIG. 14 is a perspective view of the cooling device of FIG. 12;

DESCRIPTION OF THE PREFERRED EMBODIMENTS

Figure 5:
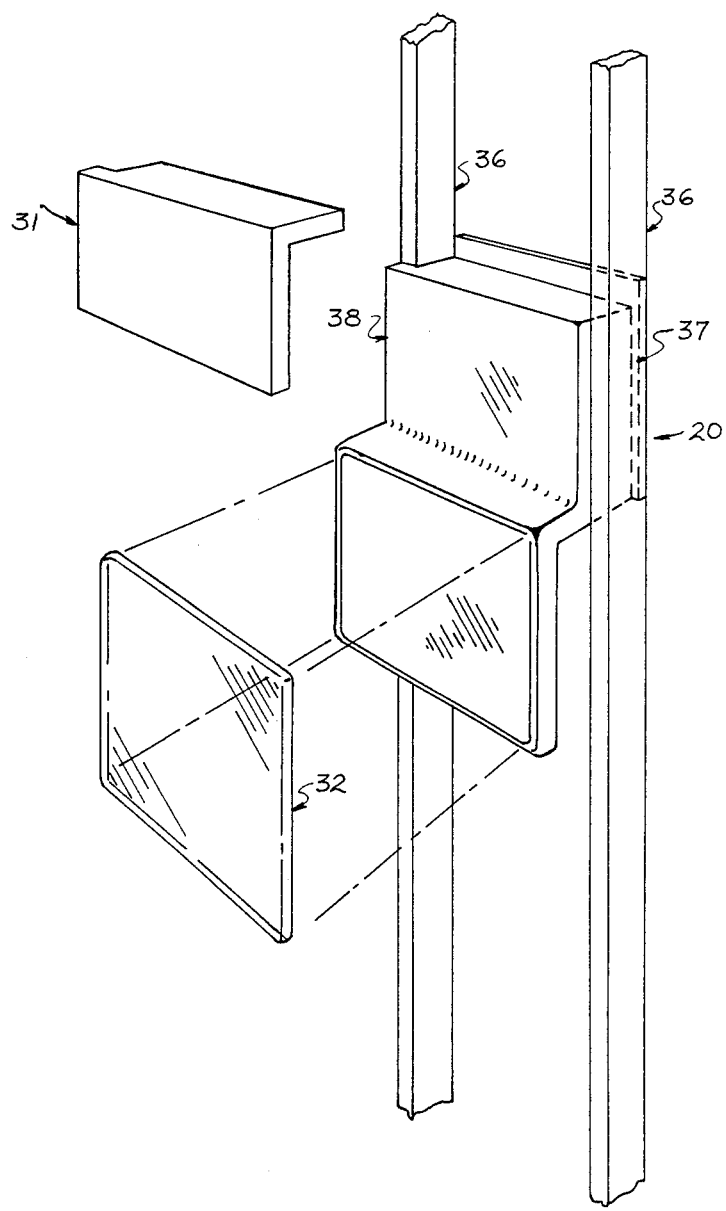
FIG. 5 is an exploded perspective view of one modular unit of the invention disposed between two adjacent wall studs of a building.
Figure 6:
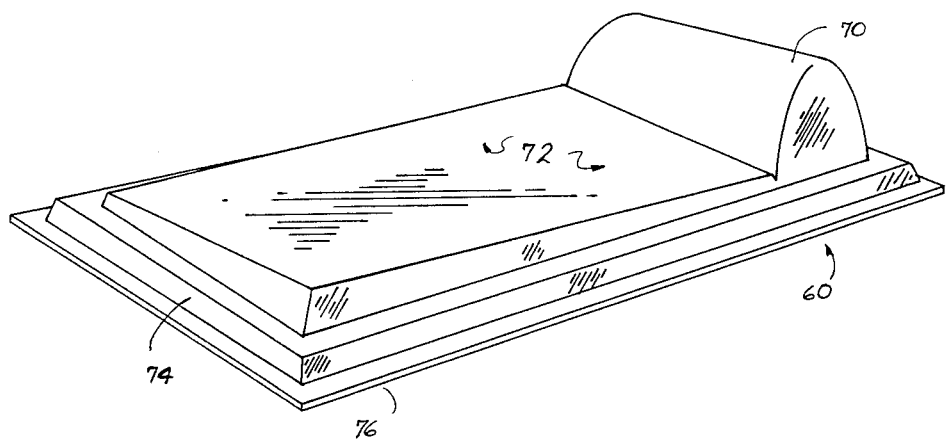
FIG. 6 is a perspective view of an alternative embodiment of the invention used as a skylight.
Figure 8:
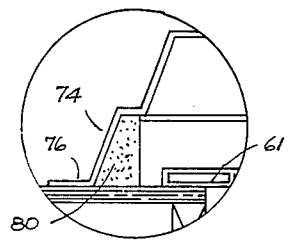
FIG. 8 is an exploded fragmentary sectional view of the drain curb and flashing portions of the embodiment of FIGS. 6 and 7.

Reference will now be made in detail to the present preferred embodiments of the invention, examples of which are illustrated in the accompanying drawings.

In accordance with the invention, the high efficiency solar heating system comprises a plurality of hollow modular units each for receiving a thermal storage mass, the units being arranged in stacked relation in an exterior frame of a building, each of the units including port means for filling the unit with the mass, a collector region and a storage region. Each of the regions has inner and outer walls, the outer wall of the collector region being oriented for exposure to sunlight for heating the thermal storage mass. The storage region has a opening therein and the collector region has a corresponding opening, the openings being joined for communicating the thermal storage mass between the storage and collector regions by thermosiphoning. The collector region is disposed substantially below an in parallel relation to the storage region in the modular unit. The inner wall of the collector region of each successive modular unit in the stacked relation extends over the outer wall of the storage region of the next lower modular unit in the stacked relation for reducing heat loss from the system.

As embodied herein, and as shown in FIGS. 1-5 a plurality of hollow modular units 20 are arranged and mounted in stacked relation in the exterior frame of a building. Although the units 20 are shown in FIG. 1 as being mounted in a building wall, the units could also be mounted in a ceiling or roof between adjacent rafters or other support members.

The units 20 are preferably thin walled and integrally formed or unitary. Each unit 20 has a suitable port 21 for filling the unit with a thermal storage mass 22. The modular unit 20 has a collector region 23 and a storage region 24. The collector region has an inner wall 25 and an outer wall 26, and the storage region has an outer wall 27 and an inner wall 28. The outer wall 26 of the collector region 23 is oriented for exposure to sunlight for heating the thermal storage mass 22.

As shown in FIG. 2, the storage region has an opening 29 therein and the collector region has a corresponding opening 30. The openings 29 and 30 are joined for communicating the thermal storage mass 22 between the storage region 24 and the collector region 23. As shown by the arrows in FIG. 2, the heated thermal storage mass 22 rises along the inner surface of the wall 26 of collector region 23, and passes through the openings 29 and 30 into the storage region 24. The storage mass continues to rise along the inner surface of wall 27. Cooler thermal storage mass is simultaneously circulating downward along the inner surface of wall 28 of the storage region 24, and through openings 30 and 29 into the collector region 23. The cooler thermal storage mass 22 then proceeds downwardly along the inner surface of wall 25 forming a continuous thermosiphoning flow path.

This unique circulation, which is established between the storage region 24 and the collector region 23 of the present invention eliminates the need for any cumbersome or complex plumbing connections. Through extensive flow visualization testing under heating and cooling cycles, it has been discovered that two opposing laminar flows are present in the collector region 23 in the same passage. These two opposing flows are separated only by a thin stationary boundary layer of fluid, all 3 layers functioning in a total cross section at leastas thin as ¼". This same flow pattern, referred to herein as "bi-laminar flow" also occurs in the storage region 24. This unique physical phenomenon makes it possible to establish a thermosiphoning cycle which is devoid of return lines, and which is not subject to reverse thermosiphoning during nighttime cooling. No freezing of collection fluid has been observed after extended exposure to zero degree F. temperatures.

As shown in FIG. 2, the collector region 23 is disposed substantially below an in parallel relation to the storage region 24. As a result of this orientation, the less dense heated storage mass remains at the top of the storage region 24 after dark, rather than sinking into the collector region 23 and losing the stored heat to the atmosphere. Thus, no complicated valves or pipes are required, and gravity holds the denser cold storage mass in the lower collector region 23 at night.

As best shown in FIG. 1, the system of the present invention provides a highly efficient means for collecting and storing solar energy. The inner wall 25 of the collector region 23 of each successive modular unit 20 in the stacked relation extends over the outer wall 27 of the next lower modular unit 20 in the stacked relation. Thus, solar energy collected by the collector region 23 and transferred to the storage region 24 must pass through the collector region of the modular unit 20 mounted above in order to be dissipated to the exterior of the building. As a result, the collector region 23 significantly reduces heat loss from the storage region 24 of the next lower modular unit 20. For further reducing the heat loss, a layer of insulation 31 may be mounted between each adjacent outer wall of the storage region 24 and inner wall of the collector region 23. As is evident, the storage area 24 of the uppermost modular unit 20 in the building wall is insulated solely by the insulation material 31. Similarly, the collector region 23 of the lowermost modular unit 20 in the building wall acts only as a collector, with no storage region 24 behind it.

A glazing panel 32 is typically attached to the outer wall 26 of the collector region 23. The glazing panel 32 may be spaced slightly from the wall 26 to create an insulation space 33 between the glazing panel 32 and the wall 26. The stacked "over and under" relationship of the modular units 20 results in a highly efficient solar collection system with dramatically reduced night losses. In essence, the collected energy is stored behind an insulating layer for the full 24 hours of the day.

As embodied herein, the walls of the storage region 24 and the collector region 23 are substantially equal in width, and the corresponding openings 29 and 30 form an integral throat 35 having a width substantially equal to the width of the walls of the storage and collector regions. The modular unit 20 is preferably integrally formed of a suitable material such as thermoplastic or glass. The entire unit may be molded of a light transmitting material, and the insulation 31 may also be formed of a light transmitting material to permit day lighting of the building interior through the modular units of the system.

The throat 35 typically has a thickness substantially equal to the average thickness of the collector region. In practice, collector regions as thin as one quarter inch have been successfully used. Nevertheless, it is believed that successful results may be achieved using throats having an average thickness substantially less than that of the collector region.

As shown in FIGS. 4 and 5, each modular unit 20 may be mounted between adjacent studs 36 in a building frame work. A pair of alternate flanges 37 and 38 are provided on opposite sides of the storage region 24 for attaching the modular unit to the studs 36. As shown in FIG. 5, the flange 37 projects laterally from the module 20 to provide a rapid and efficient guide for inserting the unit 20 between the studs 36. The flange 38 projects from the module 20 in the opposite lateral direction from the flange 37 to lock the modular unit 20 into position between the studs. Pre-drilled or molded holes 39 may be provided in the flanges 37 and 38 for firmly attaching the unit to the studs with nails or screws.

As shown in FIG. 5, the insulation 31 may be in the form of a pre-cut insert sized to fit between the studs 36 over the storage region 24. Thus, the entire unit 20 may be pre-packaged for rapid and complete installation in a building.

As best shown in FIG. 2, the unit 20 may include a fluid tight chamber 40 within the storage region 24 for receiving a second thermal storage mass. In the illustrated embodiment, a plurality of separate horizontal tubes 40 are integrally formed in the storage region 24. Each of the tubes 40 has a port in one end thereof for filling the tube with the second thermal storage mass. Typically, this second storage mass is a phase change material such as Glauber salt or any other conventional phase change, thermal storage/reradiation material. The bi-laminar thermosiphoning continually sweeps the tubes 40 with a solar heated thermal storage mass such as water, which passes over all of the surface of the tubes 40. As a result, of the presence of the phase change material, the system has a greater overall heat absorbing capacity and the entire assembly thickness can be minimized.

In the alternative embodiment shown in FIG. 3, a plurality of pellets 42 are disposed in the thermal storage mass 22. Each of these pellets contains a phase change material, for enhancing the heat absorption capacity of the system. The use of large tubular pellets (not shown) has also been explored.

The modular units may also be utilized for heating water for alternative uses. As shown in FIG. 2, a heat exchange conduit 44 passes through the upper portion of the storage area 24 and is surrounded by the thermal storage mass 22. The heated thermal storage mass warms the water in the heat exchange conduit 44 for subsequent use.

Figure 16:
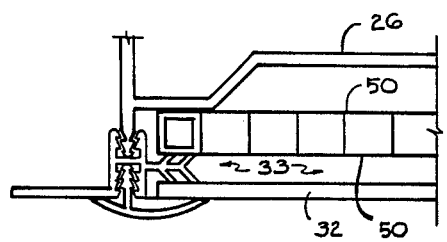
FIG. 16 is a plan section of another embodiment of the invention showing the film layers and convection suppression barriers disposed behind the glazing panel of the invention.

As discussed above, the entire modular unit may be formed integrally of a thermoplastic material or resin. The light transmission and radiation absorption characteristics of the unit are regulated by the color of the resin used. Thus, the resin may be tinted for increasing the solar absorption characteristic of the collector region. The solar absorption of a water-filled unit may also be increased by including a quantity of copper sulfate in the water. It is also possible to place an intermediate tinted plastic transparent film layer between the glazing panel 32 and the outer wall 26 of the collector region 23 for increasing the solar absorption of the collector region. Additionally, the thermal storage mass itself may be tinted for enhancing solar absorption. In FIG. 16, a pair of transparent film layers 50 are shown as being disposed between the glazing panel 32 and the outer 26 of the collector region 23. These film layers 50 reduce the heat loss from the collector region. As shown in FIG. 16, the film layers 50 include a plurality of convection suppression barriers 51 disposed between the transparent film layers. These barriers reduce the convection currents between the layers 50, and result in enhanced reduction of heat loss from the system. The layers 50 may be coated with an anti-reflective material, or a low emissivity coating if desired, for achieving varying effects on overall system performance. Thus the device described herein accomplishes collection and storage at the same level without the use of a valve by deploying several units, one above the other so the collector of one unit is on the same level as a storage unit whose collector is below and in turn, in front of yet another storage unit. This relation of relatively miniature components results in an anti-reversing solar collector/storage unit that is well insulated 24 hours a day without the need for user participation.

In a further variation of the invention, as shown in FIGS. 6-10, the modular unit may take the form of a skylight for covering an opening in the roof of a building. In this embodiment, a hollow module, generally referred to as 60, includes a collector region 61 and a storage region 62. The collector region includes an inner wall 63 and an outer wall 64 and a storage region includes an inner wall 65 and an outer wall 66. The space within the collector and storage regions is filled with a thermal storage mass, preferably water, through a suitable port 67. The outer wall 64 of the collector region 61 is oriented for exposure to sunlight for heating the thermal storage mass.

Figure 7:
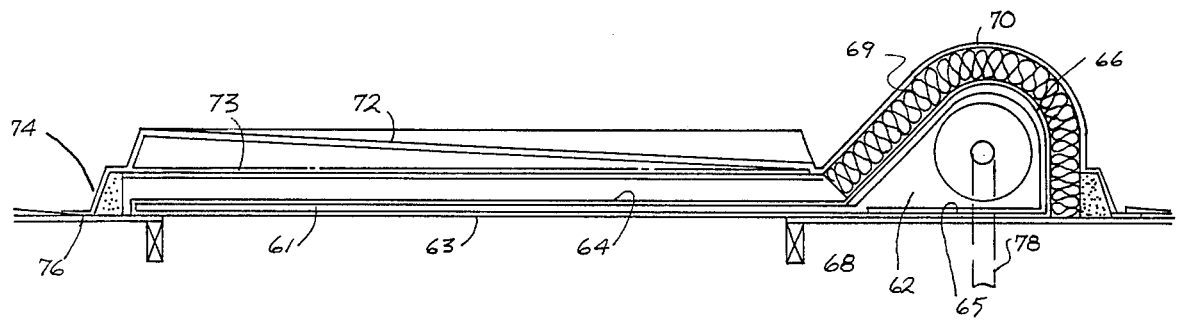
FIG. 7 is a horizontal sectional view of the embodiment of FIG. 6.

As shown in FIG. 7, the storage region 62 is joined to the collector region 61 for communicating the thermal storage mass between the storage and collector regions by thermosiphoning. As in the previously discussed embodiments, the walls of the storage and collector regions have substantially equal widths, and a pair of corresponding openings in the collector and storage regions form an integral throat 68 having a width substantially equal to the width of the walls of the storage and collector regions. The unit 60 includes a layer of insulation 69 disposed over the storage region 62 for reducing heat loss from the outer wall 66 of the storage region 62. A cover member 70 is disposed over the insulation layer for protecting the insulation from the atmosphere. A lightweight plastic glazing panel 72 is disposed over the outer wall 64 of the collector region 61. As shown in FIG. 7, one or more additional layers of plastic sheeting 73 can be fastened under the glazing layer 72 for providing additional heat absorption capability. Convection suppression barriers can be employed between multiple layers of film glazing.

The cover member 70 may be attached to the glazing panel 72, or may be integrally formed therewith. The glazing panel 72 includes a drain curb 74 integrally molded therewith for allowing moisture to run off from the unit 60. The drain curb 74 extends completely around the glazing panel 72 and the cover member 70 forming a raised ridge about the glazing panel. A flashing edge 76 extends outwardly from the drain curb 74. The flashing edge extends under the appropriate shingles or roofing material to provide a watertight seal around the unit 60. A suitable conduit 78 may be provided in the storage region 62 for heating water for other uses. To reduce heat loss around the unit 60, an insulated curb 80 may be provided directly beneath the drain curb 74.

Figure 9:
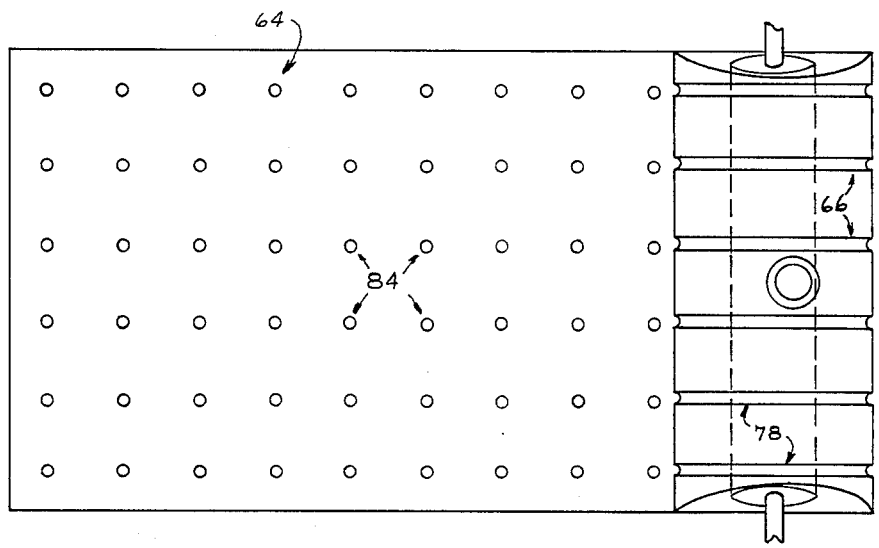
FIG. 9 is a planned view of the embodiment of FIG. 6 with the outer glazing removed.
Figure 10:
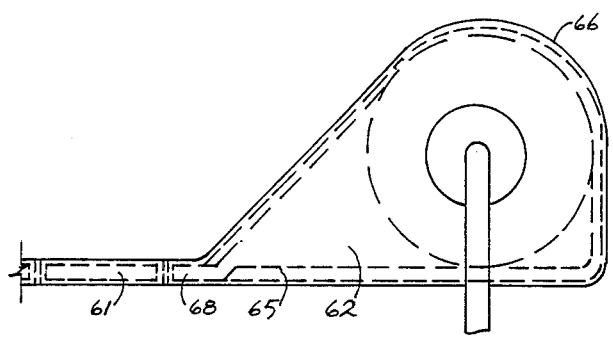
FIG. 10 is a sectional view taken along the line 1010 of FIG. 9.

In FIG. 9, the modular unit 60 as shown with the glazing panels 72 and 73, and the cover member 70 and insulation 69 removed therefrom. As is shown, the collector region 61 includes a plurality of connections 84 joining the inner and outer walls 63 and 64 of the collector region 61. Typically, the connections are arranged in a rectilinear pattern on approximately eight inch centers, and each of the connections 84 forms a recess having a draft or taper in the general shape of a cone. The connections 84 may be continuous, forming a hollow tubular recess completely through the collector region 61, or they may be discontinuous, joined at a base in approximately the center of the collector region 61.

The connections 84 prevent the inner and outer walls 63 and 64 of the collector region 61 from centrally ballooning away from one another when the unit is filled with a thermal mass. Instead, the connections 84 form tensile structures which maintain the rigidity of the walls 63 and 64.

In FIG. 11, an alternative configuration of the embodiment of FIGS. 1-5 is shown. In this embodiment, the collector region 90 is formed in the shape of a clapboard design, and the modular units 91 are mounted in overlapping relation similar to that shown in FIG. 1. In this configuration, the width of the modules 91 may be increased, and an optional groove may be molded into the storage region of the module for fitting over an intervening wall stud of a building frame.

FIGS. 12–14 show an alternative embodiment of the invention in which the system is used for cooling a building or other structure. As shown in FIG. 12, a collection and storage tank 92 is mounted in the upper region within a building 93. The tank 92 is exposed to the interior of the building 93 for collecting and storing heat from the interior. A heat dissipator 94 is joined to the tank, and the dissipator 94 is oriented above the tank and outside the building for receiving heated water from the tank 92 by thermosiphoning. The heat collected by the collection and storage tank 92 is dissipated by the dissipator 94 into the atmosphere by radiation convection and conduction and in some cases evaporation. The building 93 includes an insulation envelope 95, and the cooling device includes an integral throat 96 connecting the tank 92 and the dissipator 94. The throat 96 extends through the insulation envelope 95 to the dissipator 94. In this configuration, the mass portion is deployed in the ceiling of the living space where room heat rises into the storage within the ceiling mass. Permanent insulation covers the water mass. Heated water rises into the dissipator 94 and night sky radiation removes the heat which cools the ceiling mass for the following day. It is preferred that the tank 92, the throat 96 and the dissipator 94 be integrally formed of a lightweight thermoplastic material. In addition, the dissipator 94 includes a plurality of connections 98 similar to those in the embodiment of FIG. 9. The connections 98 provide rigidity for preventing the walls of the heat dissipator 94 from ballooning.

Another possible use of the unit is in supplying clean drinking water. In arrid climate areas water from ground water wells often contains solids which must be removed to make the water potable. By permitting water contained in the dissipator 94 to tricked down the surface of the dissipator, evaporation can provide evaporative cooling. Evaporated water may be collected in a trough (not shown) at the lower end of a transparent cover provided for this purpose to be used as drinking water.

Figure 15:
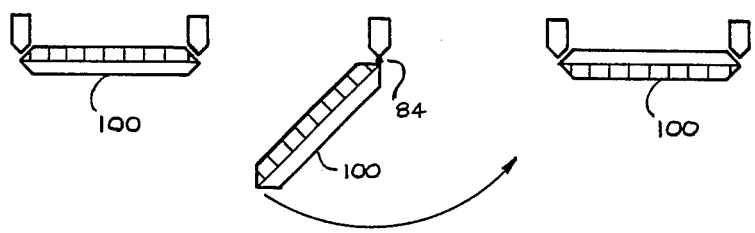
FIG. 15 is a vertical section of an alternative embodiment in which the modular units are attached to pivot means.

As is evident, the present invention provides an economical and efficient means for heating and cooling of buildings and other structures. If desired, the modular unit of FIGS. 1–5 may be attached to a suitable pivot mechanism for mounting the unit to the building frame. As shown in FIG. 15, the modular unit 100 may be attached to the building frame by a pivot 84. This allows the entire unit to be rotated or pivoted through a substantially 180 degree angle for reversing the direction of heat flow in the unit, as required by the seasons.

It will be apparent to those skilled in the art that various modifications and variations could be made in the invention without departing from the scope or spirit of the invention.

What is claimed is:

1. A high efficiency solar heating system comprising: a plurality of hollow modular units each for receiving a liquid thermal storage mass, said units being arranged in stacked relation in an exterior frame of a building, each of said units including port means for filling said unit with said mass, a collector region and a storage region, each said region having inner and outer walls, the outer wall of said collector region being oriented for exposure to sunlight for heating said thermal storage mass;
means for establishing a bi-laminar flow pattern of said liquid thermal storage mass between said storage and collector regions by thermosiphoning for simultaneous liquid flow of said thermal storage mass between said collector and storage regions;
said collector region being disposed substantially below and in parallel relation to said storage region in said modular unit;
the inner wall of the collector region of each successive modular unit in said stacked relation extending over the outer wall of the storage region of the next lower modular unit in said stacked relation for reducing heat loss from said system.

2. The system of claim 1 wherein the inner wall of said storage region is disposed for radiating heat from said thermal storage mass to the interior of said building.

3. The system of claim 2 also including insulation means mounted between each adjacent outer wall of a said storage region and inner wall of said collector region for further reducing heat loss from said system.

4. The system of claim 3 wherein said modular unit also includes glazing means attached to outer wall of collector region.

5. The system of claim 4 wherein said walls of said storage and collector regions having substantially equal widths and said flow establishing means includes corresponding openings in said collector and storage regions for forming an integral throat free of separate return lines, said throat having a width substantially equal to the width of said walls of said storage and collector regions.

6. The system of any one of claims 1, 2, 3, 4 or 5 wherein said storage and said collector regions are integrally formed.

7. The system of any one of claims 1, 2, 3, 4 or 5 wherein said modular unit is seamless.

8. A solar heating and cooling unit for mounting in an exterior frame of a building comprising:
a hollow module for receiving a liquid thermal storage mass; and port means into said module for filling said unit with said mass;
said module including a collector region and a storage region, each said region having inner and outer walls, the outer wall of said collector region being oriented for exposure to sunlight for heating said thermal storage mass; and
means for establishing a bi-laminar flow pattern of said liquid thermal storage mass between said storage and collector regions by thermosiphoning for simultaneous liquid flow of said thermal storage mass between said collector and storage regions.

9. The unit of claim 8 wherein the inner wall of said storage region is disposed for radiating heat from said thermal storage mass to the interior of said building.

10. The unit of claim 9 also including insulation means for reducing heat loss from the outer wall of said storage region.

11. The unit of claim 10 wherein said insulation means is a light transmitting material.

12. The unit of claim 11 wherein said unit is formed of a light transmitting material.

13. The unit of claim 12 wherein said light transmitting material is thermoplastic.

14. The unit of claim 8 wherein said unit is integrally molded.

15. The unit of claim 14 wherein said unit is seamless.

16. The unit of claim 8 wherein said flow establishing means includes an opening in the outer wall of said storage region, and a corresponding opening in the inner wall of said collector region, said openings being free of separate return lines and being joined for communicating said thermal storage mass between said storage and collector regions.

17. The unit of claim 8 wherein said walls of said storage and collector regions have substantially equal widths and the corresponding openings in said collector and storage regions form an integral throat having a width substantially equal to the width of said walls of said storage and collector regions.

18. The unit of claim 17 wherein said throat has a thickness substantially equal to the average thickness of said collector region.

19. The unit of claim 17 wherein said throat is thinner than the average thickness of said collector region.

20. The unit of claim 8 also including tensile means between the inner and outer walls of said collector region for maintaining the rigidity of said walls when said collector region is filled with said thermal storage mass.

21. The unit of claim 8 also including tensile means between the inner and outer walls of said storage region for maintaining the rigidity of said walls when said storage region is filled with said thermal storage mass.

22. The unit of claim 8 also including a fluid-tight chamber within said storage region for receiving a second thermal storage mass, said second thermal storage mass for absorbing heat from said thermal storage mass.

23. The unit of claim 22 wherein said chamber includes a plurality of separate horizontal tubes integrally formed in said storage region, each said tube including port means for filling said tube with said second thermal storage mass.

24. The unit of claim 23 wherein said second thermal storage mass is a phase change material.

25. The unit of claim 8 also including flange means for attaching the module to the frame of a building.

26. The unit of claim 8 also including glazing means attached to the outer wall of the collector region.

27. The unit of claim 26 wherein said glazing means includes a glazing panel and said outer wall of said collector region includes a raised edge on the perimeter thereof for supporting said glazing panel and for forming an air space between said outer wall and said glazing panel.

28. The unit of claim 8 wherein the inner wall of said storage region includes a decorative pattern integrally molded thereon.

29. The unit of claim 8 also including a conduit integrally formed through said storage region for transmitting water through said storage region and heating said water.

30. The unit of claim 27 also including insulation means for reducing heat loss from said outer wall of said storage region, and a cover member for protecting said insulation means, said cover being integral with said glazing panel.

31. The unit of claim 30 wherein said glazing panel includes a drain curb integrally molded therewith.

32. The unit of claim 31 wherein said glazing panel also includes a flashing edge integrally molded to said drain curb.

33. The unit of claim 32 wherein at least one of the outer wall and inner walls of said collector region is tinted for increasing the solar absorption by said collector region.

34. The unit of claims 32 or 33 wherein said thermal storage mass is water, and said mass includes a quantity of copper sulfate for increasing the solar absorption of said collector region.

35. The unit of claim 32 also including an intermediate tinted plastic transparent film layer disposed between said glazing panel and said outer wall of said collector region for increasing solar absorption of said collector region.

36. The unit of claim 35 wherein said thermal storage mass is tinted for enhancing solar absorption by said mass.

37. The unit of claim 34 also including a pair of transparent film layers disposed between said glazing panel and said outer wall of said collector region for reducing heat loss from said collector region.

38. The unit of claim 37 wherein said film layers include a plurality of convection suppression barriers disposed between said transparent film layers.

39. The unit of claim 38 wherein said film layers include an anti-reflective coating.

40. The unit of claim 39 wherein said film layers include a low-emissivity coating.

41. A modular cooling device for a building comprising:
   a thermal collection and storage tank mounted in the upper region within said building, said tank for receiving a liquid thermal storage mass, and being exposed to the interior of said building for collection and storage of heat from said interior;
   a heat dissipator joined to said tank, said dissipator being oriented above said tank and outside said building for receiving heated thermal storage mass from said tank by thermosiphoning, and for dissipating heat collected by said collection and storage tank into the atmosphere by radiation, said building including an insulation envelope, and said device including means for establishing a bi-laminar flow pattern of said liquid thermal storage mass between said tank and said dissipator, including an integral throat extending through said insulation envelope to said dissipator said throat being free of separate return lines.

42. The device of claim 41 wherein said tank, said throat and said dissipator are integral.

43. The device of claim 42 wherein said tank, said throat and said dissipator are seamless.

44. The unit of claim 8 also including pivot means for mounting said unit in said building frame for movement of said unit through a 180 degree angle between a first position wherein said outer wall of said collector region faces the exterior of said building and a second position wherein said outer wall of said collector region faces the interior of said building for seasonally reversing the direction of heat flow in said unit.

* * * * *